W. M. BRADSHAW.
TERMINAL BLOCK FOR ELECTRICAL MEASURING INSTRUMENTS.
APPLICATION FILED FEB. 19, 1914.
1,210,036.
Patented Dec. 26, 1916.
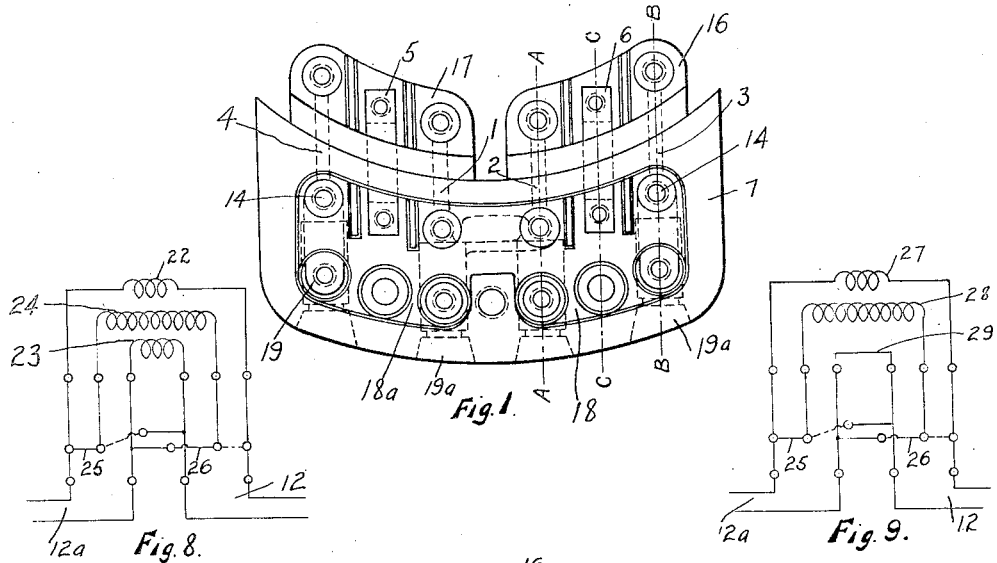
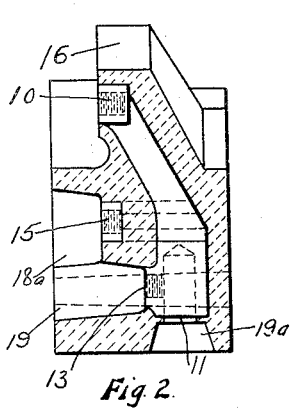
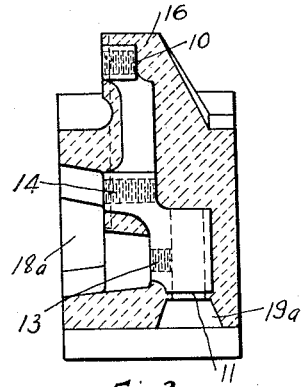
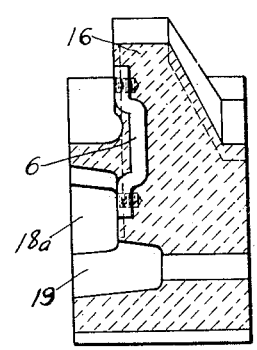
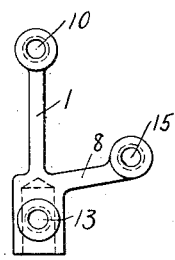
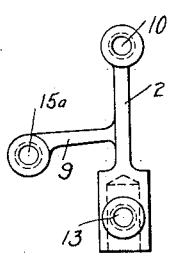
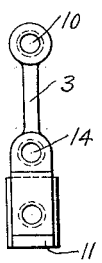
WITNESSES:
INVENTOR
William M. Bradshaw
BY
Wesley L. Carr
ATTORNEY

UNITED STATES PATENT OFFICE.

WILLIAM M. BRADSHAW, OF WILKINSBURG, PENNSYLVANIA, ASSIGNOR TO WESTINGHOUSE ELECTRIC AND MANUFACTURING COMPANY, A CORPORATION OF PENNSYLVANIA.

TERMINAL BLOCK FOR ELECTRICAL MEASURING INSTRUMENTS.

1,210,036.  Specification of Letters Patent.  Patented Dec. 26, 1916.

Application filed February 19, 1914. Serial No. 819,705.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Terminal Blocks for Electrical Measuring Instruments, of which the following is a specification.

My invention relates to electrical measuring instruments and particularly to terminal blocks for such instruments.

The object of my invention is to provide a terminal block of such form, dimensions, and structural characteristics as shall adapt it to the service to be performed.

Watthour meters are provided with current windings to be connected in series relation to the circuits, the energy of which is to be metered and with voltage windings to be connected in shunt relation to such circuits.

It frequently becomes necessary to reverse the positions of the leading-in conductors from left to right, or from right to left to adapt the meter for either right or left hand feed. In order that the desired reversal may be effected without placing the voltage winding in such connection to the circuit that the current therein will traverse the current windings and be measured, I provide a terminal block that permits of the reversal of the voltage winding without disconnecting any of the conductors.

My invention has a further advantage in that it is as readily applicable to three wire meters as it is to two wire meters.

In the accompanying drawings, Figure 1 is a plan view of a terminal block embodying my invention. Fig. 2 is a sectional view taken along the line A—A of Fig. 1. Fig 3 is a sectional view taken along the line B—B of Fig. 1. Fig. 4 is a sectional view taken along the line C—C of Fig. 1. Figs. 5, 6 and 7 are detail plan views of certain metal parts utilized in my invention, Fig. 8 is a diagrammatic view of circuits showing the application of my invention to a three-wire watt meter, and Fig. 9 is a diagrammatic view of circuits showing the application of my invention to a two-wire watt meter.

My invention comprises four metal connectors 1, 2, 3 and 4, two metal straps 5 and 6 and a non-absorbent insulating member 7 molded around the connectors and straps, substantially as shown in Fig. 1 of the drawings. The connectors 1 and 2 are respectively provided with laterally projecting arms 8 and 9 and with screw holes 10 adjacent to their inner ends. The outer ends of the connectors are provided with recesses 11 to receive the conductors 12 and $12^a$ of the circuit to be metered. Transversely disposed screw holes 13 communicate with the openings 11 to receive binding screws (not shown) for retaining the conductors securely in the openings. The connectors 3 and 4 are severally provided with screw holes 14 intermediate their ends for the reception of binding screws. The laterally projecting arms 8 and 9 are provided, at their extremities with screw holes 15 and $15^a$, respectively, to receive binding screws, for purposes hereinafter set forth.

The several connectors are located substantially as shown in Fig. 1 of the drawings, so that the screw hole 15 of the laterally extended arm 8 of the connector 1 is substantially above the connector 2 and the screw hole $15^a$ of the arm 9 is substantially above the connector 1, though the parts do not come into direct contact with each other. The metal straps 5 and 6 are located between the connectors 1 and 4 and 2 and 3, respectively, for purposes hereinafter set forth. The insulating member 7 is molded into such shape as to conform to the meter (not shown) to which it is to be attached, and it has two laterally projecting portions 16 and 17 which extend into the interior of the meter, and a main portion 18 that has a cavity $18^a$ therein. The portion 18 is usually located in a receptacle (not shown) that depends from the meter casing. The connectors are so located with respect to the molded member 7 that the outer ends of the screw holes 10 are located at the outer surfaces of the projections 16 and 17, and the outer ends of the screw holes 14, 15 and $15^a$ are located at the outer bottom surface of the main cavity 18ᵃ in the portion 18. Screw holes are provided in the ends of the straps 5 and 6 for reasons hereinafter set forth.

Holes 19 are drilled into the molded member 7 directly in line with the holes 13, and similar holes are drilled in the front surface of the member 7 directly in line with the recesses 11 for the reception of the conductors 12. The outer surfaces of the front ends of the connectors are substantially lower than the outer surfaces of their rear ends in order to increase the extent of surface insulation between the holes 14, 15 and 15ᵃ and the holes 13.

Referring now particularly to Fig. 8 of the drawings, two current windings 22 and 23 of a watthour meter (not shown) are connected to the inner terminals of the connectors 3 and 4 and 1 and 2, respectively, by the aid of screws (not shown) which are inserted in the screw holes 10. A voltage winding 24 has its terminals connected to the screws (not shown) which are inserted in the inner holes of the conducting straps 5 and 6. The voltage winding 24 is connected in shunt relation to the conductors 12 and 12ᵃ by connecting the intermediate point of the connector 4 to the outer end of the strap 5 and by connecting the hole 15 of the connector 1 to the outer end of the strap 6. Two conductors 25 and 26 are respectively used to make the connections. When a change from right to left hand feed is desired, the outer end of the strap 5 is connected to the hole 15ᵃ of the connector 2 and the outer end of the strap 6 is connected to the intermediate point of the connector 3, as shown in the dotted lines of the drawing. This reversal of the conductors 25 and 26 changes the connection of the voltage winding 24 with respect to the current windings 22 and 23 so that the current that traverses the same will not traverse the current windings and thus will not be measured.

Referring to Fig. 9 of the drawing, a current winding 27 and a voltage winding 28 are connected to the respective terminal members of the terminal block, and the inner ends of the connectors 1 and 2 are connected together by a conductor 29. The conductors 12 and 12ᵃ are the conductors from the line and to the load respectively, as hereinbefore explained. The intermediate point of the connector 4 is connected to the outer end of the strap 5 and the hole 15 of the connector 1 is connected to the outer end of the strap 6 by conductors 25 and 26, respectively, as hereinbefore described. When it becomes necessary to reverse the connections of the winding 28 to the conductors of the circuit by reason of a change from right to left hand feed, the terminals are connected as shown in the dotted lines. The change in the connections is made by the same method as that described in connection with Fig. 8.

While I have described my invention with respect to a particular form of construction, it is understood that changes may be made in the same which do not depart from the spirit of my invention as defined in the appended claims.

I claim as my invention:

1. A terminal block comprising a plurality of electrical connectors having oppositely disposed and laterally extending arms, a molded insulating member disposed around the said connectors, the outer ends of each of the said arms being disposed above and insulated from the main portion of the adjacent connector.

2. A terminal block comprising a plurality of connectors and an insulating block molded around the same, said connectors severally having three openings at the top and one opening at one end, said openings extending through the said block.

3. In a terminal block, the combination with a plurality of parallel connectors severally having binding screw holes therein and openings for receiving electrical conductors, two of the said connectors having laterally disposed and oppositely projecting arms, the ends of which are disposed substantially above the other connector, of a molded structure of non-absorbent insulating material for supporting and insulating the said connectors.

4. A terminal block comprising two connectors having laterally extending arms, the ends of each of the said arms being disposed above the other connector and a molded structure disposed around the connectors for supporting the same and for insulating the connectors from each other.

5. A terminal block comprising a molded insulation member having a recess in the top portion thereof and a plurality of openings in the recessed portion and in one side thereof, a plurality of connectors disposed in the molded member, said connectors severally having three binding screw holes at the top and one opening at one end that are adapted to register with the openings in the molded member.

6. A terminal block comprising a plurality of connectors and an insulating block molded around the same, said connectors severally having three openings at the top and one opening at one end and two of the connectors having laterally disposed and oppositely projecting arms.

7. A terminal block comprising a molded insulation member having a recess in the top portion thereof and a plurality of openings in the recessed portion and in one side thereof, a plurality of connectors disposed in the molded member, said connectors severally having three openings at the top and one opening at one end that are adapted to register with the openings in the molded member and two of said connectors having laterally extending arms the ends of each of the said arms being disposed above the other connector that is provided with an arm.

In testimony whereof, I have hereunto subscribed my name this 13th day of Feb., 1914.

WILLIAM M. BRADSHAW.

Witnesses:
 INA H. BROWN,
 B. B. HINES.